Patented May 28, 1946

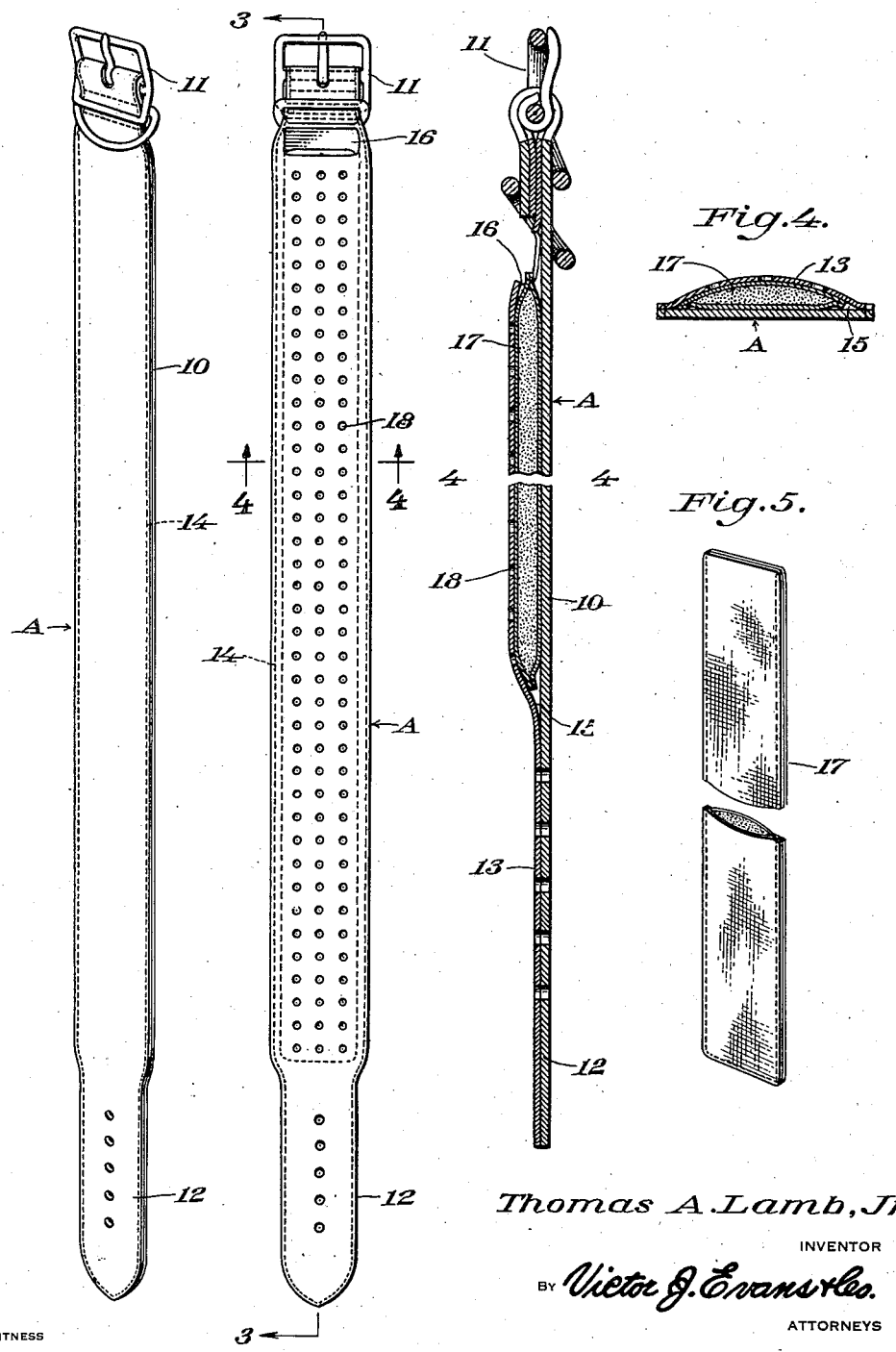

2,401,253

UNITED STATES PATENT OFFICE 2,401,253

FLEA-GUARD DOG COLLAR

Thomas A. Lamb, Jr., Memphis, Tenn.

Application April 5, 1944, Serial No. 529,661

1 Claim. (Cl. 119—106)

The invention relates to an animal collar, and more especially to a flea eradicating dog collar.

The primary object of the invention is the provision of a collar of this character, wherein an absorbent filler is pocketed therein, so that a flea powder or liquid can be carried by said filler and in this way functioning to rid fleas from the animal when wearing the collar, the latter being of novel construction, to enable the easy application of the powder or liquid for flea eradicating purposes.

Another object of the invention is the provision of a collar of this character, wherein the pocket for the filler is readily accessible for the introduction of the latter therein and also to permit convenient application of the flea powder or liquid thereto. The collar by reason of its construction assures safety to the animal when wearing the same, as it cannot lick the powder or liquid which would be the case when applied directly to the body of such animal.

A further object of the invention is the provision of a collar of this character, which is simple in construction, thoroughly reliable and efficient in its purpose, strong, durable, neat in appearance, capable of functioning as a carrier for the flea powder or liquid, and inexpensive to manufacture.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a perspective view of a collar constructed in accordance with the invention.

Figure 2 is an outer face view thereof.

Figure 3 is a vertical longitudinal sectional view thereof.

Figure 4 is a sectional view taken on the line 4—4 of Figure 2 looking in the direction of the arrows.

Figure 5 is a perspective view of the flea powder or liquid carrier removed from the collar.

Similar reference characters indicate corresponding parts throughout the several views in the drawing.

Referring to the drawing in detail, A designates generally the animal collar in its entirety as constructed in accordance with the invention, and comprises a main strap-like body 10, preferably made from leather or any other suitable reasonably flexible material having the required strength and durability. This body 10 for a major portion of its length is uniform in width, yet it may be otherwise.

At one end of the body 10 is loosely connected a buckle 11 in which is detachably and adjustably engaged the holed end 12 when the collar is applied to the animal for the wearing thereof.

On the outer face of the body 10 is a facing piece 13 of any suitable material, which is partially or wholly coextensive therewith, it being marginally stitched or otherwise secured at 14 to the said body, to provide a pocket or cell 15 having an entrance or mouth opening 16 at one extremity thereof. In this pocket or cell 15 is removably inserted a wad or pad 17 carrying a flea powder, flea exterminating liquid or other flea eradicating substance, impregnated or otherwise confined thereby.

The outer walled side of the pocket or cell 15 has spaced rows of spaced perforations 18 therein which are distributed throughout the area of the said pocket or cell to emit fumes from the wad or pad of the powder, liquid or other substance carried thereby for the dissipating of fleas from the animal when wearing the collar, or the eradication of such fleas from its body.

The confining of the substance within the pocket or cell 15 prevents the animal from licking the powder, liquid or substance, which would occur if it was applied directly to such animal, as is now common practice, as well as eliminating the shaking off of such powder, liquid or substance, by the animal from its body.

What is claimed is:

A collar of the kind described, comprising an animal neck embracing member provided in the major portion of its length with a pocket having a wall provided with spaced parallel rows of spaced perforations extending longitudinally the entire length of said pocket, and forming the outermost wall of said member, the said member being formed with an entrance to the pocket at the extremity of one end thereof, a flea eradicating substance carrier removably fitted within the pocket and insertable through the entrance thereto, and means associated with the member for maintaining the members in an embracing form on the neck of the animal.

THOMAS A. LAMB, JR.